United States Patent
Mater, Jr. et al.

(10) Patent No.: US 7,530,591 B2
(45) Date of Patent: May 12, 2009

(54) PIN BOX ASSEMBLY FOR TRAILER

(75) Inventors: Robert F. Mater, Jr., Elkhart, IN (US);
Gomer B. Jones, Elkhart, IN (US)

(73) Assignee: Cequent Performance Products, Inc., Plymouth, MI (US)

( * ) Notice: Subject to any disclaimer, the term of this patent is extended or adjusted under 35 U.S.C. 154(b) by 170 days.

(21) Appl. No.: 11/451,670

(22) Filed: Jun. 13, 2006

(65) Prior Publication Data
US 2007/0284852 A1    Dec. 13, 2007

(51) Int. Cl.
*B60D 1/60* (2006.01)
(52) U.S. Cl. .................. 280/507; 280/441; 280/433; 280/416.1
(58) Field of Classification Search ................ 280/507, 280/441, 433, 416.1, 483
See application file for complete search history.

(56) References Cited

U.S. PATENT DOCUMENTS

| | | |
|---|---|---|
| 2,351,151 A | 6/1944 | Sattler |
| 3,695,213 A | 10/1972 | Littlefield |
| 3,792,432 A | 2/1974 | Ellis et al. |
| 3,897,086 A | 7/1975 | Breford |
| 4,131,296 A | 12/1978 | Strader |
| 5,328,198 A | 7/1994 | Adams |
| 5,403,031 A | 4/1995 | Gottschalk et al. |
| 5,785,341 A * | 7/1998 | Fenton ................ 280/441 |
| 5,890,728 A * | 4/1999 | Zilm ................. 280/433 |
| 6,170,849 B1 | 1/2001 | McCall |
| 6,170,850 B1 | 1/2001 | Works |
| 6,375,211 B1 | 4/2002 | Mackarvich |
| 6,581,951 B2 | 6/2003 | Lange |
| 6,726,396 B2 | 4/2004 | Plett |
| 6,746,037 B1 | 6/2004 | Kaplenski et al. |
| 6,854,757 B2 | 2/2005 | Rehme |
| 6,877,757 B2 | 4/2005 | Hayworth |
| 6,913,276 B1 | 7/2005 | Bauder |
| 6,957,823 B1 | 10/2005 | Allen |
| 6,971,660 B1 | 12/2005 | Putnam |
| 6,986,524 B2 | 1/2006 | Heitzmann |
| 7,000,937 B2 | 2/2006 | Dick |
| 7,121,574 B2 | 10/2006 | Bouwkamp |
| 7,164,081 B1 | 1/2007 | Tollefson |
| 7,222,872 B1 | 5/2007 | Bauder |
| 2006/0043694 A1 | 3/2006 | Kaun |

OTHER PUBLICATIONS

International Patent Application PCT/US07/08118 filed Mar. 30, 2007 International Search Report mailed Jan. 25, 2008.
International Patent Application No. PCT/US2008/066569 International Search Report and Written Opinion mailed Aug. 29, 2008.

* cited by examiner

*Primary Examiner*—Paul N Dickson
*Assistant Examiner*—Tashiana Adams
(74) *Attorney, Agent, or Firm*—Woodard, Emhardt, Moriarty, McNett & Henry LLP

(57) ABSTRACT

A pin box assembly is provided for a trailer. The pin box assembly includes a first section having a trailer attachment point, a second section carrying a king pin and a pivot connecting the first and second sections together. In addition the pin box assembly includes a shock absorber having a first end connected to the first section and a second end connected to the second section. Still further, the pin box assembly includes an air spring connected between the first and second sections.

10 Claims, 4 Drawing Sheets

PIN BOX ASSEMBLY FOR TRAILER

TECHNICAL FIELD

The present invention relates generally to the towing equipment field and, more particularly, to a new and improved pin box assembly for a trailer.

BACKGROUND OF THE INVENTION

The present invention relates to a new pin box assembly for a trailer that provides both softening in the vertical direction and anti-chucking in the longitudinal or horizontal direction so as to provide enhanced performance and a smoother ride. In effect the pin box assembly acts as a buffer between the tow vehicle and the trailer, significantly reducing the negative impact of vertical shock and longitudinal chucking to provide an improved ride. The assembly relieves stress on the towing vehicle, trailer frame, cabinets, mechanicals and support mechanisms. The smoother ride also reduces fatigue for drivers and passengers in the towing vehicle.

SUMMARY OF THE INVENTION

In accordance with the purposes of the present invention as described herein, a pin box assembly is provided for a trailer. The pin box assembly comprises a first section including a trailer attachment point, a second section carrying a king pin, a pivot connecting the first section and the second section together, a shock absorber having a first end connected to the first section and a second end connected to the second section and an air spring connected between the first section and the second section. More specifically, the shock absorber is provided between the air spring and the trailer attachment point. The air spring is provided between the shock absorber and the pivot. Still further, the pivot is provided at a front end of the assembly. In addition the trailer attachment point is provided adjacent a rear end of the assembly.

More specifically describing the invention, the air spring and the shock absorber are provided between the trailer attachment point and the king pin. The air spring and the shock absorber are both offset from the king pin and the trailer attachment point. In addition the first section includes a top wall and two downwardly depending side walls. The second section includes a skid plate and two upwardly depending side skirts. The margins of the two downwardly depending side walls and two upwardly depending side skirts overlap so as to form an enclosure with the top wall and the skid plate. The enclosure receives and protects the air spring. Still further, in one embodiment the air spring is a rubber air bladder.

In the following description there is shown and described one possible embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of this specification, illustrate several aspects of the present invention, and together with the description serve to explain certain principles of the invention. In the drawings.

DETAILED DESCRIPTION OF THE INVENTION

Figure 1:
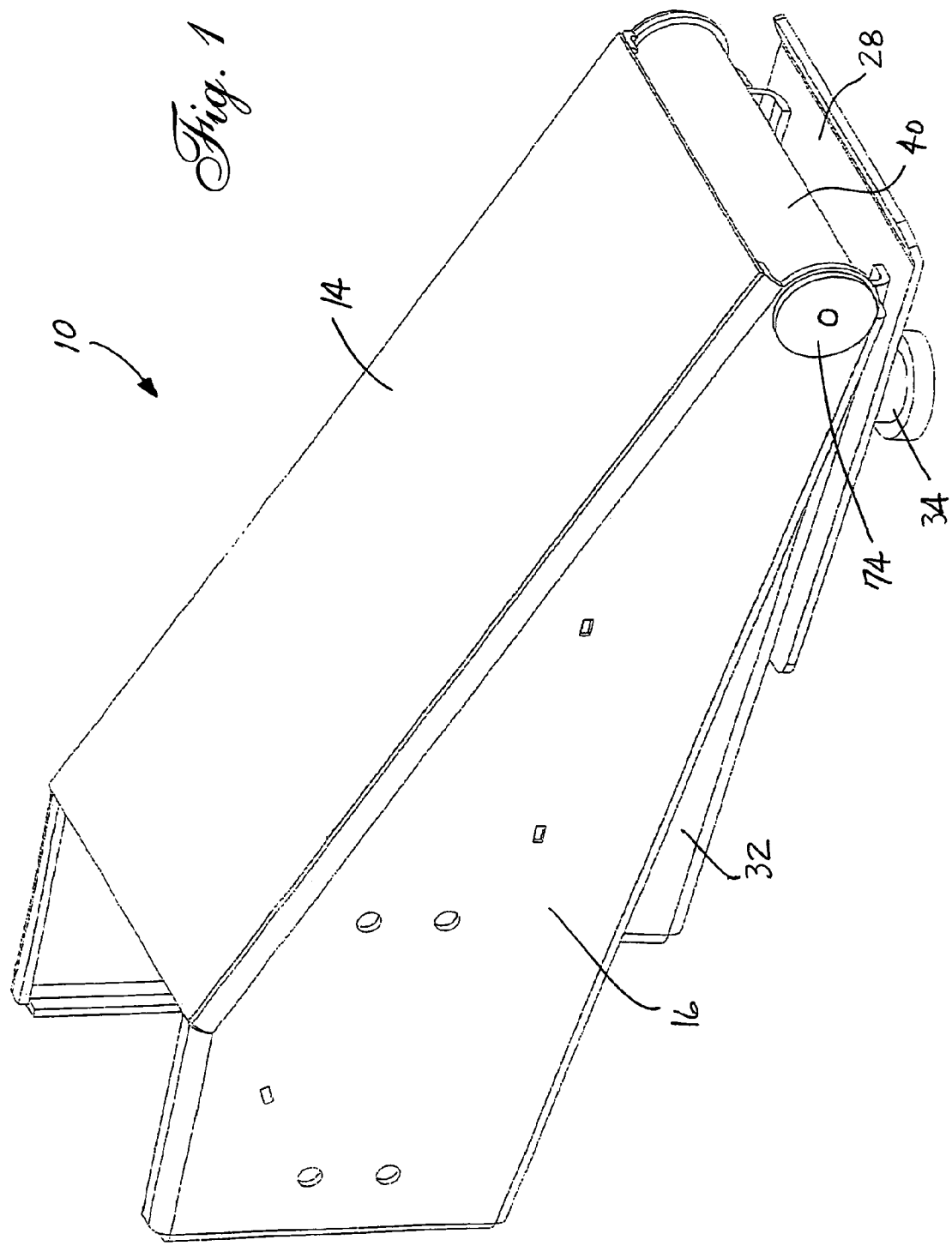
FIG. 1 is a perspective view illustrating the pin box assembly of the present invention.
Figure 2:
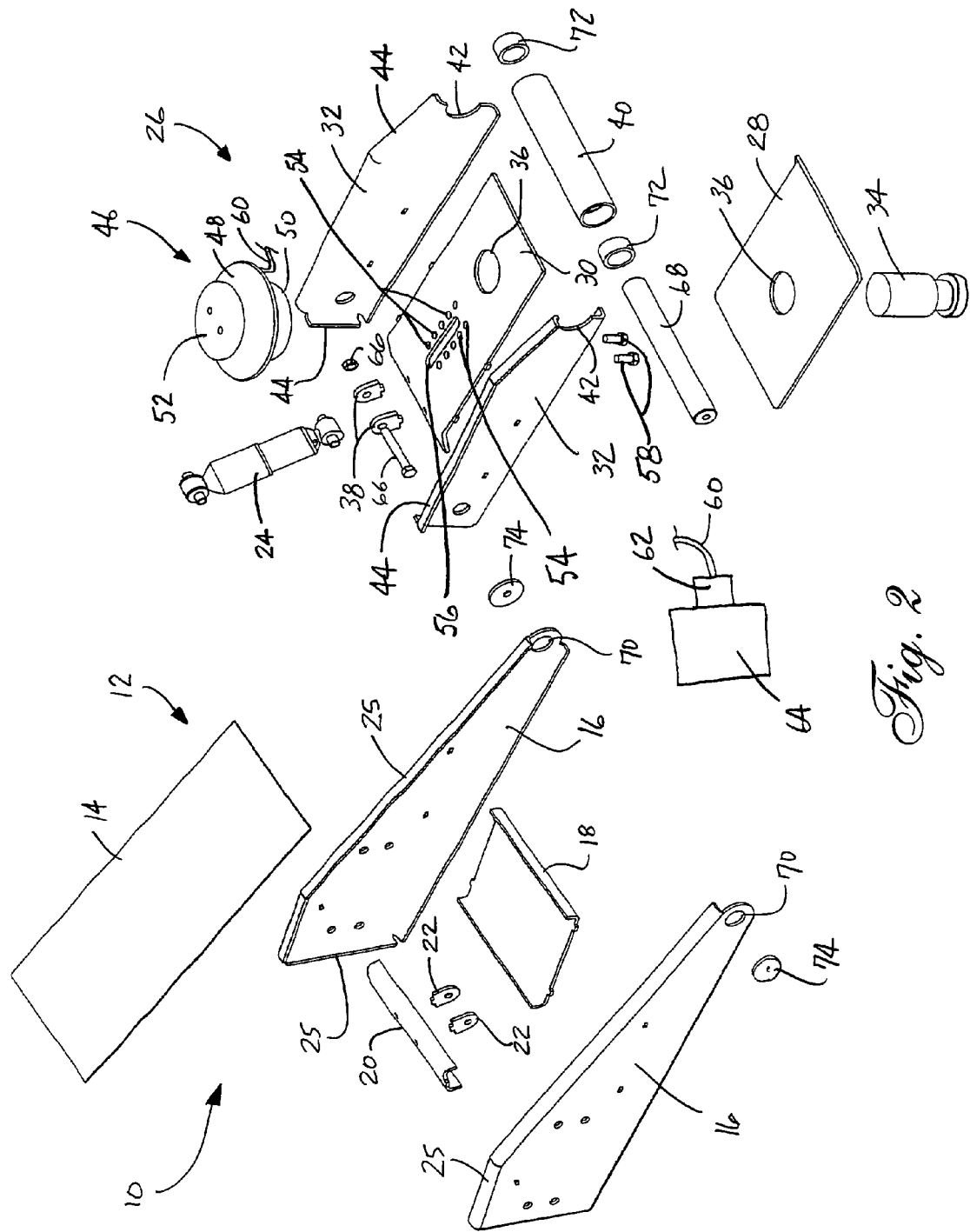
FIG. 2 is an exploded perspective view of the pin box assembly of the present invention.
Figure 3:
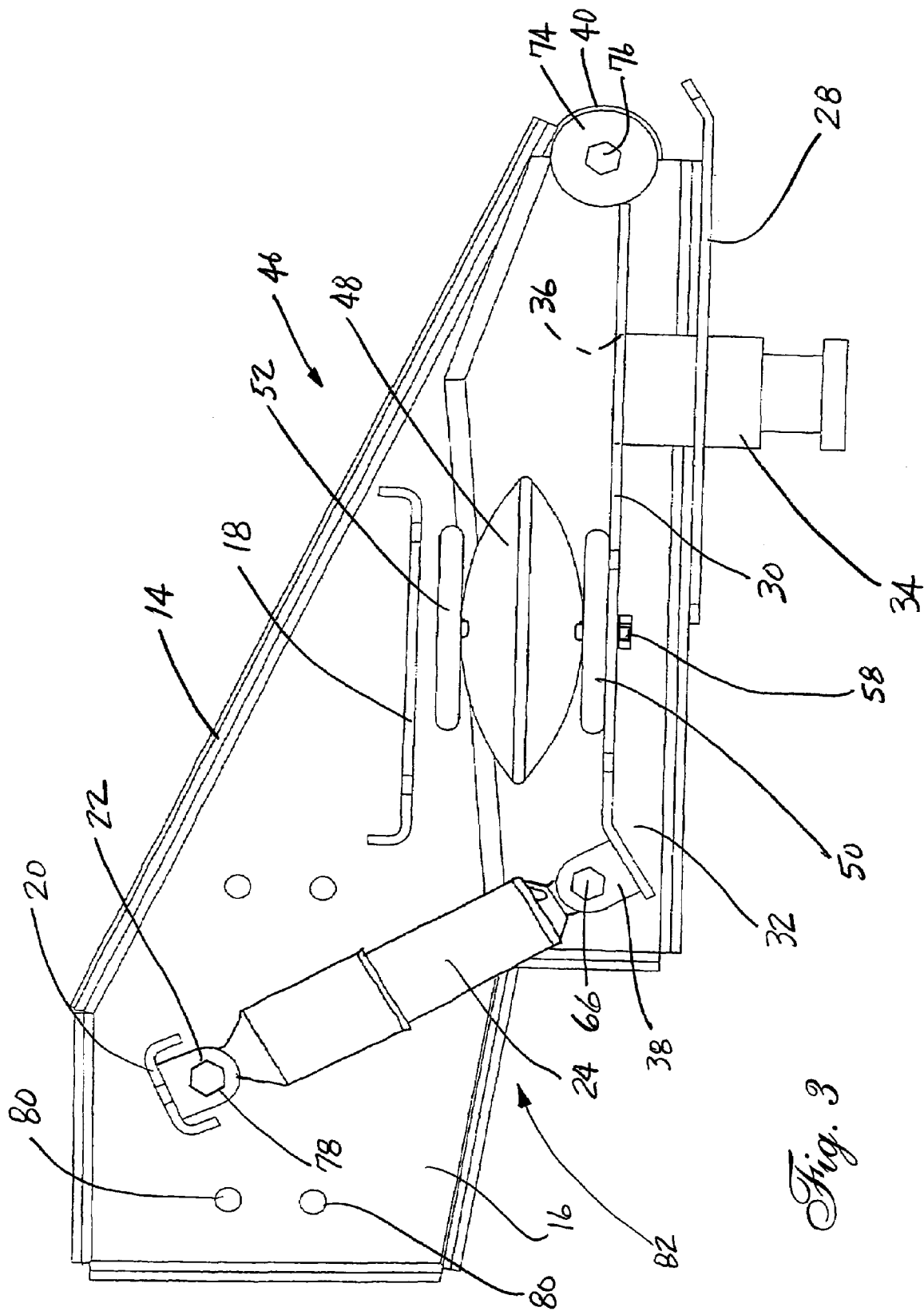
FIG. 3 is a side elevational view of the pin box assembly illustrated in FIGS. 1 and 2 with the near side wall and side skirt removed to show the enclosure and connection of the shock absorber and air spring.
Figure 4:
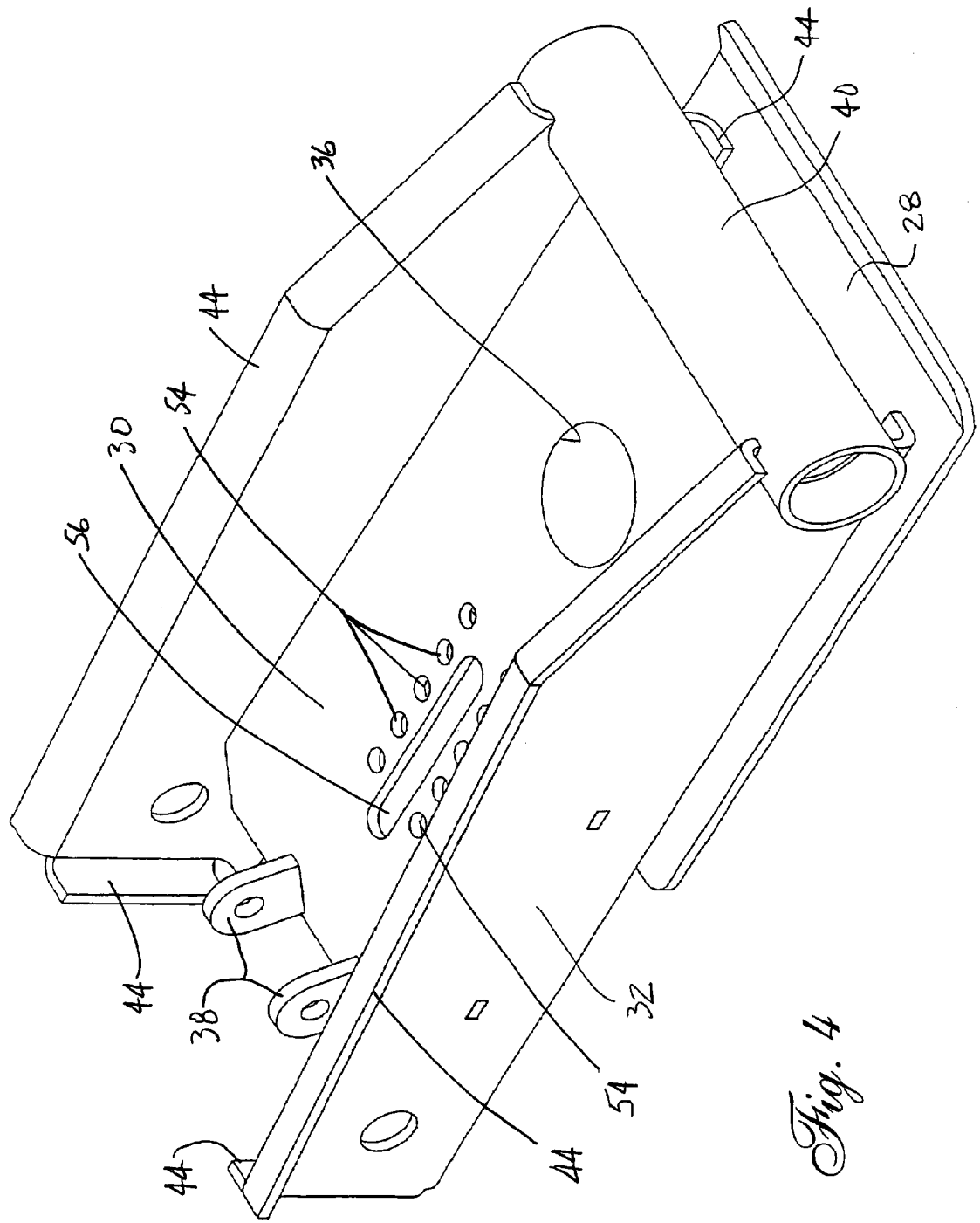
FIG. 4 is a detailed perspective view of the assembled second section of the pin box assembly.

Reference is now made to FIGS. 1-4 illustrating the pin box assembly 10 of the present invention. The pin box assembly 10 includes a first section 12 having a top wall 14 and two downwardly depending sidewalls 16. A cross member 18 extends between the sidewalls and provides additional strength and rigidity to the structure. A shock absorber mounting bracket 20 also extends between the sidewalls. The mounting bracket 20 includes a pair of ears 22 that cooperate to form a trunnion mounting for one end of a shock absorber 24 in a manner that will be described in greater detail below. The top wall 14, sidewalls 16, cross member 18, mounting bracket 20 and ears 22 may all be constructed from steel for high strength and may all be connected together by welding if desired. The sidewalls 16 may also include rounded edges or return flanges 25 in order to provide added strength while minimizing weight.

The pin box assembly 10 also includes a second section 26 incorporating a skid plate 28, an upper king pin support plate 30 and two upwardly depending side skirts 32. A king pin 34 includes a mounting end that is received and welded into cooperating, aligned apertures 36 provided in the skid plate and the upper king pin support plate 30. This two point mounting of the king pin 34 enhances the low transfer characteristics of the assembly 10. A pair of ears 38 are welded adjacent a rear end of the upper support plate 30 and function as a trunnion to receive one end of the shock absorber 24. A pivot tube 40 is received and welded in cooperating slots 42 provided in the front end of the side skirts 32. Like the sidewalls 16, the side skirts 32 include return flanges 44 for added strength. The skid plate 28, upper king pin support plate 30, side skirts 32, king pin 34, ears 38 and pivot tube 40 may all be constructed from high strength steel and, for example, may all be secured together by welding if desired.

An air spring, generally designated by reference numeral 46 includes an air bladder 48, a bottom or base plate 50 and a top plate 52. The upper king pin support plate 30 includes two series of aligned apertures 54 and an elongated slot 56 therebetween. The base plate 50 of the air spring 46 is secured to the support plate 30 by fasteners such as a pair of cooperating bolts 58. The point of attachment of the air spring 46 to the support plate 30 may be adjusted fore and aft to optimize the performance of the assembly 10 for differing trailer weights by aligning the two mounting apertures in the base plate 50 with different sets of the cooperating mounting apertures 54 provided in the support plate. The air bladder 48 of the air spring 46 is connected by a line 60 that passes through the slot 56 and connects through a valve 62 with an air source 64. The lower end of the shock absorber is connected to the ears 38 by means of the cooperating nut and bolt 66.

The first section 12 and second section 26 are pivotally connected together at the front end thereof by means of pivot shaft 68 that passes through the aperture 70 in one of the side walls 16, the pivot tube 40 of the second section 26 and the aperture 70 of the other sidewall 16. Bushings 72 provided between the pivot shaft 68 and the pivot tube 40 insure free pivoting action between the two sections 12, 26. Outer retainer washers 74 and a cooperating nut and bolt 76 complete the pivotal connection. A cooperating nut and bolt 78 completes the connection of the upper end of the shock absorber 24 to the ears 22 on the first section 20. Aligned apertures 80 in the sidewalls 16 function as the trailer attachment point for the pin box assembly 10 in a manner that will be described in greater detail below.

As should be appreciated from reviewing the drawing figures, the margins of the sidewalls 16 and side skirts 32 overlap so that the sidewalls, side skirts, top wall 14 and skid plate 28 define an enclosure 82. In the illustrated embodiment, the shock absorber 24 is provided at the opening of the enclosure 82 between the mounting apertures or trailer attachment point 80 and the air spring 46 (see particularly FIG. 3). The air spring 46 is provided in the enclosure 28 between the shock absorber 24 and the forward pivot tube 40. In this position, deep in the enclosure 82, the air spring 46 is well protected from UV exposure, malicious tampering and road hazards thereby substantially increasing its service life. The rear mounted shock absorber 24 is also shielded from road hazards and together the first and second sections 12, 26 provide a clean, aesthetically pleasing streamlined design.

The pin box assembly 10 of the present invention may be secured by bolts, cooperating nuts and washers to the frame of a trailer. More specifically, the mounting apertures or trailer attachment point 80 are aligned with cooperating apertures in the frame of the trailer. The bolts are then inserted through the aligned apertures, lock washers are then positioned over the bolts and the cooperating nuts are tightened to complete the connection. Of course, any other appropriate attachment method known in the art could be utilized including, for example, welding. The king pin 34 of the pin box assembly 10 is then positioned in the jaw assembly of a fifth wheel trailer hitch mounted to the bed of a towing vehicle. The jaw assembly of the fifth wheel trailer hitch is then locked in a manner known in the art. The pin box assembly 10 functions with the pivoting head of the fifth wheel trailer hitch to provide two separate pivot points to reduce fore and aft movement on the tow vehicle and up and down movement on the trailer.

The expandable and compressible air spring 46 regulates the compression and expansion rates of the pin box assembly 10. Where an air source 64 such as an air compressor is contained within the trailer, the driver may adjust the air pressure in the air spring 30 and accordingly, the compression and expansion rates in order to provide more ideal ride characteristics. More specifically, this allows the operator to tune the performance of the pin box assembly 10 so as to avoid operating at the natural harmonic/Hz frequency of the tow vehicle. The valve 62 is used to control the air flow from the source 64 to the bladder 48 of the air spring 46 or from the air spring to the environment to release pressure. When inflated for use, the top plate 52 engages the bearing surface 90 of the cross member 18.

The shock absorber 24 functions to provide conventional dampening during the towing of the trailer. By moving the pivot shaft or pivot point 40 forward of the king pin 34 center line, the pivot now works in better harmony with the fifth wheel hitch to which the pin box assembly 10 and trailer are connected thereby significantly reducing longitudinal chucking during trailer towing. More specifically, the pin box assembly 10 of the present invention successfully combines the best performance characteristics of the leading air-ride and anti-chucking couplers to provide better softening in the vertical direction and anti-chucking in the longitudinal direction so as to provide better overall performance than devices of the prior art.

The foregoing description of a preferred embodiment of the present invention has been presented for purposes of illustration and description. It is not intended to be exhaustive or to limit the invention to the precise form disclosed. Obvious modifications or variations are possible in light of the above teachings. For example, for some applications the air spring is aft of the shock absorber: that is, the positions of the air spring and shock absorber are reversed. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims and their fair and broad interpretation in any way.

What is claimed is:

1. A pin box assembly for a trailer, comprising:
a first section including a trailer attachment point;
a second section carrying a king pin;
a pivot connecting said first section and said second section together;
a shock absorber having a first end connected to said first section and a second end connected to said second section, wherein said pivot is forward of said shock absorber when said first section is attached to the trailer at said trailer attachment point; and
an air spring connected between said first section and said second section.

2. The pin box assembly of claim 1 wherein said shock absorber is provided between said air spring and said trailer attachment point.

3. The pin box assembly of claim 2, wherein said air spring is provided between said shock absorber and said pivot.

4. The pin box assembly of claim 1, wherein said trailer attachment point is provided adjacent a rear end of said assembly.

5. The pin box assembly of claim 4, wherein said air spring and said shock absorber are provided between said trailer attachment point and said king pin.

6. The pin box assembly of claim 5, wherein said air spring and said shock absorber are both offset from said king pin and said trailer attachment point.

7. The pin box assembly of claim 1, wherein said first section includes a top wall and two downwardly depending sidewalls.

8. The pin box assembly of claim 7, wherein said second section includes a skid plate and two upwardly depending side skirts.

9. The pin box assembly of claim 8, wherein margins of said two downwardly depending sidewalls and two upwardly depending side skirts overlap so as to form an enclosure with said top wall and said skid plate, said enclosure receiving and protecting said air spring.

10. The pin box assembly of claim 9, wherein said air spring is a rubber air bladder.

* * * * *